Sept. 6, 1949.  M. FUNKHOUSER  2,481,210

SHOCK ABSORBER

Filed May 14, 1947

INVENTOR.
MEARICK FUNKHOUSER
BY
Spencer, Hardman and Fehr
HIS      ATTORNEYS.

Patented Sept. 6, 1949

2,481,210

UNITED STATES PATENT OFFICE 2,481,210

SHOCK ABSORBER

Mearick Funkhouser, Dayton, Ohio, assignor to General Motors Corporation, Detroit, Mich., a corporation of Delaware Application May 14, 1947, Serial No. 747,988

5 Claims. (Cl. 188—88)

This invention relates to improvements in hydraulic shock absorbers, particularly of the direct acting type.

It is among the objects of the present invention to provide a direct acting type of shock absorber with means for eliminating or reducing air content within the working cylinder.

A further object of the present invention is to provide a non-returnable escape means for air ejected from within the working chamber of the cylinder.

Further objects and advantages of the present invention will be apparent from the following description, reference being had to the accompanying drawing, wherein a preferred embodiment of the present invention is clearly shown.

Figure 1:
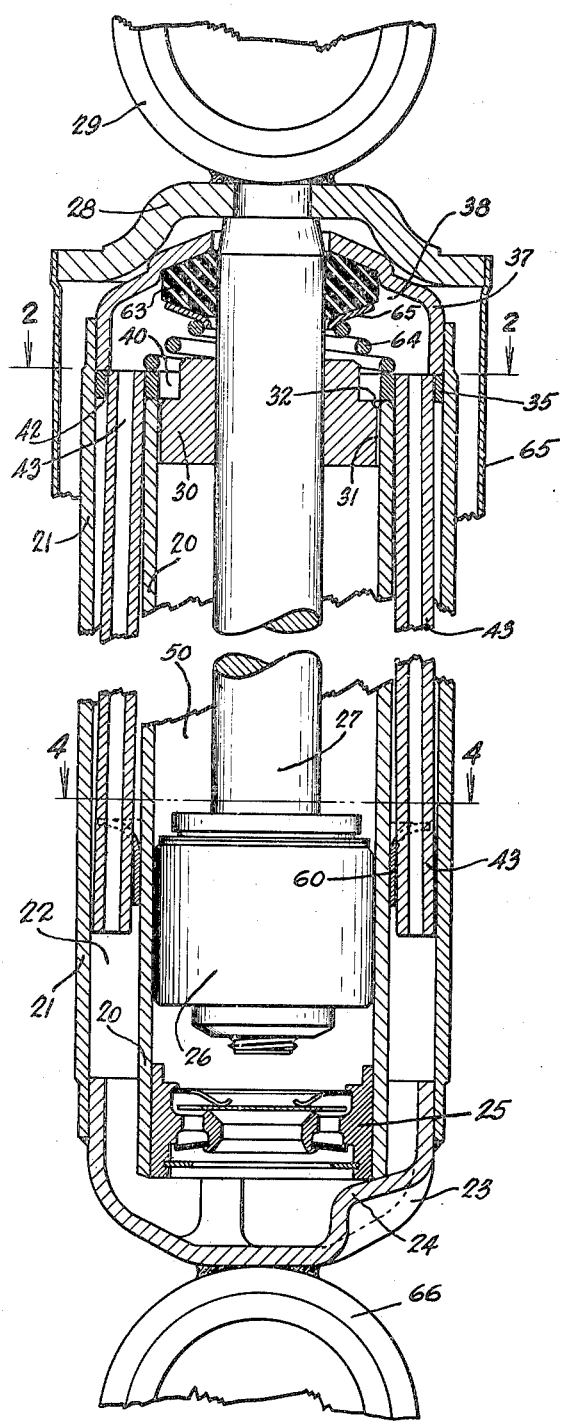
Fig. 1 is a longitudinal sectional view of a direct acting hydraulic shock absorber equipped with the present invention.
Figure 2:
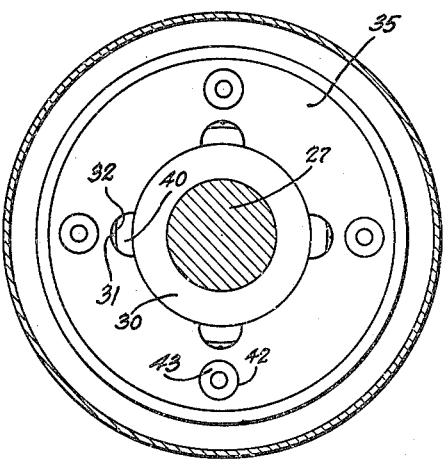
Fig. 2 is a transverse section taken along the line 2—2 of Fig. 1.
Figure 3:
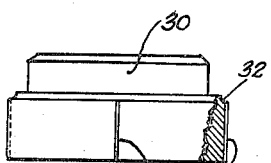
Fig. 3 is a detail view of one closure member of the working cylinder.
Figure 4:
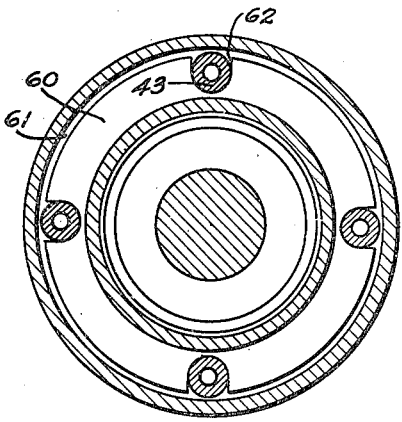
Fig. 4 is a transverse sectional view taken substantially along the line 4—4 of Fig. 1.

The direct acting type shock absorber of the present invention comprises two concentric tubes. The inner tube 20, which forms the working cylinder of the shock absorber, is surrounded by the outer tube 21, thereby forming an intermediate chamber 22 which is termed the "fluid reservoir." A closure cup 23 fits within one end of the outer tube 21 and is secured thereto in any suitable manner preferably by welding. A plurality of radially spaced ribs 24 are provided within the cup shaped closure member 23 and form abutments upon which the inner tube 20 rests.

A valve cage 25 is provided in the working cylinder or tube 20 at its end which rests upon the radial ribs 24, this valve cage being provided with differential valve mechanism controlling the flow of fluid between the interior of the cylinder and the reservoir 22 as the fluid displacement element or piston 26 is reciprocated within said cylinder. This piston 26 has differential valve mechanism of any suitable standard design adapted to provide for the transfer of fluid from one side of the piston to the other as said piston is reciprocated within the cylinder 20 by the rod 27 which extends through and is slidably supported in a central opening in plug 30 which fits within the end of the inner tube or working cylinder 20 opposite the end containing the valve cage 25. This plug 30 has one or more longitudinal grooves 31 in the outer peripheral surface thereof received by the working cylinder 20. These longitudinal grooves terminate in an annular groove 32 formed in the surface of the plug 30 lying within the confines of the working cylinder 20.

A cover plate 35 fits within the outer tube 21 and engages both the plug 30 and the end of the inner tube or working cylinder 20. It is urged into clamping engagement with said inner tube 20 by a cover cup 37 which fits into the end of the outer tube 21, is pressed upon said cover plate 35 to urge it into clamping engagement with the cylinder 20 and is secured to the outer tube 21 in any suitable manner. Cover cup 37 forms a chamber 38 outside the confines of the plug 30 and the cover plate 35. A series of openings 40 are provided in the cover plate 35 and are arranged as to form communication between the annular groove 32 in the cover plate and the chamber 38. Thus longitudinal grooves 31, the annular groove 32 and the openings 40 provide communication between the chamber 50 within the working cylinder 20 and the chamber 38 within the cover cup 37 and outside the confines of the plug 30 and the reservoir cover plate 35.

Cover plate 35 also has a plurality of holes 42 into each of which one end of a tube 43 is fitted. Each tube 43 extends downwardly through the reservoir to a predetermined distance beneath the normal level of the fluid therein. These tubes are of comparatively small diameter and provide communication between the chamber 38 and the fluid reservoir 22 beneath the normal level of the fluid therein. A baffle ring 60 is provided in the reservoir 22 the ring surrounding and having its inner peripheral edge secured to the outer surface of the inner tube or cylinder 20. The outer peripheral surface of said baffle ring is spaced a predetermined distance from the inner surface of the outer tube 21 so as to form an annular space 61 providing a restricted communication between the reservoir portion above the baffle ring 60 and the space there beneath. This baffle ring 60 restricts the free movement of fluid in the reservoir, particularly the agitation of the fluid resulting from the shaking or manipulation of the shock absorber itself during operation of the vehicle upon which it is placed. The baffle ring is normally positioned in the reservoir 22 so that it is beneath the normal level of the fluid therein. This ring has notches 62 through which the tubes 43 extend. As shown in Fig. 1, the pipes 43 extend a greater distance below the normal level of the fluid within the reservoir than the baffle ring 60.

Within the chamber 38 formed by the cover cup 37 there is a packing element 63 urged into sealing engagement with the interior surface of the element 37 and the outer peripheral surface of the rod by a spring 64 interposed between an abutment ring 65 on the packing and the cover disc or plate 35.

If any air is present within the chamber 50 of the cylinder 29 and as the piston 26 moves upwardly, this air will be forced through the channels, provided by the grooves 31 in the plug 30, into the annular groove 32 then through the openings 40 in the cover plate into the chamber 38, thence downwardly through the pipes 43 into the fluid within the reservoir 22 where it will rise above the surface of the fluid therein. With the air thus ejected through pipes 43 and trapped in the reservoir 22 above the surface of the fluid therein, it will not be possible again to draw it back through the pipe 43 into the chamber 38.

From the foregoing it may be seen that the provisions of the pipes 43 providing communication between the air receiving chamber 38 and the fluid within the reservoir 22 act as a means for causing the fluid to be trapped in the reservoir above the fluid level therein and thereby entirely segregate the air from the working chambers of the shock absorber.

The piston rod 27 in the present instance, has a disc 28 and a mounting ring 29 secured thereto in any suitable manner. The disc 28 has a tube 65 secured thereto which surrounds the outer tube 21 and provides a guard therefor. A similar mounting ring 66 is secured to the closure member 23 at the opposite end of the shock absorber.

From the foregoing it may be seen that the present invention provides an hydraulic shock absorber in which air within the cylinder is forced through conduits into the fluid within the reservoir, the air then rising through the fluid to the space in the reservoir above the fluid, where said air is trapped and substantially segregated from the working chambers of the cylinder.

While the embodiment of the present invention as herein disclosed, constitutes a preferred form, it is to be understood that other forms might be adopted, all coming within the scope of the claims which follow.

What is claimed is as follows:

1. An hydraulic shock absorber comprising a cylinder having a head member through which a rod slidably extends, said rod being attached to a piston within the cylinder; a tube closed at one end, surrounding the cylinder and forming a fluid containing reservoir; a cap at the other end of the tube, forming a chamber outside the cylinder head member; a partition interposed between the cap and head member and separating the reservoir from said chamber; means in the cylinder head member and the partition, providing communication between the chamber and the interior of the cylinder; and pipes supported in the partition, providing communication independent of the cylinder between the said chamber and the fluid reservoir beneath the normal level of the fluid therein.

2. An hydraulic shock absorber comprising inner and outer tube members, the former providing a working cylinder, the latter a fluid reservoir; a plug in the one end of the inner tube; a piston in said inner tube, having a rod slidably extending through said plug; an annular groove in the wall of the plug engaging the inner tube and longitudinal grooves in said plug wall connecting said annular groove with the interior of the working cylinder; a cover plate fitting into the outer tube and engaging the end of the inner tube and said plug; a cover cap secured to the outer tube and holding the cover plate upon the cylinder end, said cover cap forming a chamber outside the cylinder plug and cover plate; openings in the cover plate providing communication between the annular groove and said chamber; and comparatively small bore tubes independent of the cylinder extending through and secured in openings in the cover plate and extending down into the fluid reservoir beneath the normal fluid level therein, said tubes communicating with said chamber.

3. An hydraulic shock absorber comprising a cylinder having a head member at each end; a piston in the cylinder, said piston having an actuating rod extending through one of the cylinder end heads; an annular groove in the cylinder engaging surface of said one cylinder end head; grooves in said end head surface, cooperating with the cylinder wall to form passages connecting the annular groove with the interior of the cylinder; an outer tube forming a fluid containing reservoir; a cover plate in said outer tube and engaging the end of the cylinder and the grooved head thereof, said plate having a plurality of openings certain of which aline and communicate with the annular groove in the cylinder head; pipes secured at one end in the other openings of the cover plate and extending down into the fluid reservoir beneath the normal level of the fluid therein; a retainer cap secured to the outer tube and engaging the cover plate to urge it into clamping engagement with the end of the cylinder, said cover cap forming a chamber outside the fluid reservoir but in communication therewith through the pipes; and a packing in said chamber surrounding the piston rod, and urged into sealing engagement with said rod and cap.

4. A shock absorber in accordance with claim 3, in which, however, a baffle ring is provided in the reservoir beneath the normal level of the fluid therein, the inner peripheral portion of said ring being secured to the cylinder, the outer peripheral edge being spaced from the inner wall of the outer tube to provide an annular fluid passage, the ring having notches through which the pipes in the reservoir pass.

5. An hydraulic shock absorber comprising a cylinder having a head member at each end and a piston therein, provided with an actuating rod extending through one of said head members; an annular groove in the outer wall of the said one head member; grooves in said outer wall providing communication between the annular groove and the interior of the cylinder; an outer tube, surrounding the cylinder and providing a fluid containing reservoir; a cover plate in said outer tube, said plate having a plurality of openings, certain of which aline and communicate with the annular groove in the head member; a cup-shaped retainer cap secured to the outer tube and engaging the cover plate to urge it into clamping engagement with the end of the cylinder and said one head member, said cap forming a chamber outside the cover plate; means secured in the other openings of said cover plate and providing communication between the said chamber and the reservoir beneath the normal level of the fluid therein; a baffle in the reservoir beneath the fluid level therein, providing a restricted annular passage for the fluid, said baffle having openings through which said aforementioned means extend; and a packing in the cap chamber yieldably urged into sealing engagement with the piston rod and retainer cap.

MEARICK FUNKHOUSER.

REFERENCES CITED

The following references are of record in the file of this patent:

UNITED STATES PATENTS

| Number | Name | Date |
| --- | --- | --- |
| 2,324,058 | Boor et al. | July 13, 1943 |
| 2,431,966 | Rossman | Dec. 2, 1947 |
| 2,435,160 | Rossman | Jan. 27, 1948 |